US006983723B2

(12) United States Patent
Brewster et al.

(10) Patent No.: US 6,983,723 B2
(45) Date of Patent: Jan. 10, 2006

(54) METHOD AND APPARATUS FOR PROVIDING ON-DEMAND HOT WATER

(76) Inventors: Jackie L. Brewster, 230 - 1855 Kirschner Road, Kelowna British Columbia (CA) V1Y 4N7; Stephen T. Collens, 2711 Six Mile Lakes Road, Nelson British Columbia (CA) V1L 6K8; J. Murray Massier, 2245 Santa Ana, Las Cruces, NM (US) 88011

( * ) Notice: Subject to any disclaimer, the term of this patent is extended or adjusted under 35 U.S.C. 154(b) by 0 days.

(21) Appl. No.: 11/149,367

(22) Filed: Jun. 10, 2005

(65) Prior Publication Data

US 2005/0274329 A1 Dec. 15, 2005

Related U.S. Application Data

(60) Provisional application No. 60/578,299, filed on Jun. 10, 2004.

(51) Int. Cl.
*F27D 17/00* (2006.01)

(52) U.S. Cl. ........................................ 122/15.1; 122/33

(58) Field of Classification Search ............... 122/15.1, 122/31.1, 33, 36, 13.01, 504, 448.1, 406.1
See application file for complete search history.

(56) References Cited

U.S. PATENT DOCUMENTS 3,670,807 A * 6/1972 Muller ........................ 165/299
4,046,189 A * 9/1977 Clark, Jr. .................... 165/299
5,209,284 A * 5/1993 Okamoto et al. ........... 165/292

* cited by examiner

*Primary Examiner*—Gregory Wilson
(74) *Attorney, Agent, or Firm*—Antony C. Edwards

(57) ABSTRACT

Waste heat from a steam cycle employing a steam boiler is used to heat water, on an on-demand basis, in a steam-to-water heat exchanger wherein the supply of steam into the heat exchanger is regulated so as to maintain the temperature of the heated water exiting the heat exchanger at a relatively constant pre-set temperature. Further waste heat may be recaptured from the steam boiler steam cycle by pre-heating the incoming cold water being fed into the steam-to-water heat exchanger in the on-demand water heater using the still-hot condensate from the condensation of the steam in the steam-to-water heat exchanger. A condensate-to-water heat exchanger may be employed to pre-heat the cold water infeed to the steam-to-water heat exchanger.

20 Claims, 7 Drawing Sheets

METHOD AND APPARATUS FOR PROVIDING ON-DEMAND HOT WATER

CROSS REFERENCE TO RELATED APPLICATION

This application claims priority from U.S. Provisional Patent Application No. 60/578,299 filed Jun. 10, 2004 entitled On-Demand Water Heater.

FIELD OF THE INVENTION

This invention relates to steam driven hot water heaters and more specifically very compact low-pressure (I 5 psi to 300 psi) steam driven hot water-on-demand heat exchangers for use primarily in light industrial and commercial applications such as dry cleaners having continuously operational boilers which are not continuously in use to their full capacity.

BACKGROUND OF THE INVENTION

It is known that on heating, water-on-demand can be more efficient than heating and storing a tank of water as in a domestic hot water tank. To date most on-demand hot water heaters are powered by either electricity or gas (natural gas or propane). It is also known that heat exchangers have been used in industrial applications where high pressure steam is used to provide on-demand heating of water using primarily large U-tube or straight-through tube-type heat exchangers as in the Flo-Rite Steam Instantaneous Water heater made by Armstrong of Three Rivers, Mich., and the Instantrol Steam/Fluid Heater Package made by Robertshaw of Knoxville, Tenn. The heated water temperature is generally maintained by a thermally responsive valve that controls the inlet steam.

Another on-demand water heater is the MicroMix II produced by the Graham of Batavia, N.Y., in which water heated in a steam fed helical-coil heat exchanger is mixed with cold feed water using a thermally controlled mixing valve to achieve the desired output water temperature.

Applicant is also aware of patents regarding such on-demand heaters and variants such as:

U.S. Pat. No. 6,739,288 which issued to Kumamoto on May 25, 2004, teaches a method of regulating temperature between a heat exchanger and a condensate recovering unit by means of a steam ejector valve.

U.S. Pat. No. 4,278,069 which issued to Clark, Jr. on Jul. 14, 1981, teaches a water heater using an elongated vessel having a heat exchanger at one end leaving a volume storage and blending zone at the other end of the vessel.

U.S. Pat. No. 5,233,970 which issued to Harris on Aug. 10, 1993, teaches a helical coil heat exchanger in between two cylindrical metal sheets immersed in a tank of water to be heated.

U.S. Pat. No. 6,275,655 which issued to Rixen on Aug. 14, 2001, teaches a supplemental heating system configured for recreational vehicle use where hot engine coolant is circulated through a heat exchanger to heat potable domestic water using a compact heat exchanger and in some cases either thermal control of the feed valve, or mixing of hot and cold water to achieve desired water temperatures.

Many light industrial or commercial applications such as dry cleaners, hotels, etc presently use boilers for supply of steam and hot water. Typically the boilers will be run continuously during business hours, if not longer. In the use of boilers producing hot water, once the water is heated it may be stored for later use. In the case of boilers producing steam, the steam may not be usefully stored as it will return to condensate. Consequently, in the case of steam producing boilers, herein referred to as steam boilers, there exists a thermal inefficiency in producing steam which goes un-used and so is lost to condensate as it cools, only to be returned to the boiler to be re-heated. One object of the present invention is, in one embodiment, to recapture such wasted heat in an on-demand water heater by the use of a steam-to-water heat exchanger. Another object is to further recapture waste heat from the steam boiler by using the return steam condensate to pre-heat cold water entering the steam-to-water heat exchanger.

SUMMARY OF THE INVENTION

A first aspect of the present invention is therefore utilizing waste heat from a steam cycle employing a steam boiler in an industrial or commercial facility so as to heat water, on an on-demand basis, in a steam-to-water heat exchanger wherein the supply of steam into the heat exchanger is regulated so as to maintain the temperature of the heated water exiting the heat exchanger at a relatively constant pre-set temperature for end use in the industrial or commercial facility. In one embodiment this is accomplished by a temperature sensor sensing the outlet temperature of the heated water exiting the heat exchanger, and the sensed temperature being used to trigger opening or closing of a steam regulator regulating the in-flow of steam into the heat exchanger. Thus the steam regulator is opened to allow pressurized steam to flow into and through the heat exchanger when the outlet water temperature falls before a desired pre-set hot water temperature, and the steam regulator is closed once the pre-set hot water temperature is attained.

A second aspect of the present invention is further recapturing waste heat from the steam boiler steam cycle by pre-heating the incoming cold water being fed into the steam-to-water heat exchanger in the on-demand water heater using the still-hot condensate from the condensation of the steam which is typically recycled directly to a condensate tank cooperating with the steam boiler. Thus a further heat exchanger, a condensate-to-water heat exchanger, may be employed to pre-heat the cold water infeed to the steam-to-water heat exchanger thereby possibly boosting the efficiency or productivity (maximum available flow rate) and reducing the delay in the on-demand water heater in producing hot water at the desired temperature. For example, if the desired temperature is one hundred forty degrees Fahrenheit and the cold water infeed is pre-heated in the condensate-to-water heat exchanger to one hundred ten degrees Fahrenheit (that is, to approximately the temperature of the steam condensate), then the steam-to-water heat exchanger in the on-demand water heater only has to further heat the cold water infeed a further thirty degrees Fahrenheit. For a given maximum heat transfer rate in the steam-to-water heat exchanger, reducing the required increase in water temperature to go from the cold water infeed temperature to the desired outlet temperature may increase the attainable maximum flow rate through the on-demand water heater and reduces the time delay from the time the demand is made for hot water to the time it is delivered at the desired temperature, for example, to less than three seconds.

In one example, the present invention serves to heat water on demand using low pressure (15 psi to 300 psi) steam as a energy source, as commonly found in commercial dry-cleaning and laundering facilities, collectively referred to as cleaning facilities. Cleaning facilities commonly employ steam, for example in steam pressing of clothes. This source of steam is thus available for other uses, which is particularly efficient because steam, if not used, is quickly lost as condensate. Thus using steam that may not otherwise be used in cleaning facilities creates a re-capture efficiency. In the present invention, the recapture efficiency allows the use of steam to generate on-demand hot water in facilities such as cleaning facilities that use large quantities of hot water and can often ill-afford the space and expense of commercial boilers and the like. The present invention in one embodiment controls the inflow of steam by a self-modulating temperature control valve driven by the output water temperature of the on-demand water heater. The steam passes through a compact brazed-plate heat exchanger in which heat is transferred from the steam to domestic feed-water to an adjustably desired temperature, advantageously 140° F. in cleaning facilities.

In summary, the present invention may be characterized in one aspect as a device and a method for providing on-demand hot water including:

a) providing an on-demand water heater which itself includes:
   i) a steam infeed conduit,
   ii) a steam flow regulator cooperating with the steam infeed conduit to regulate the flow of steam through the steam infeed conduit according to a trigger signal governed by a hot water outlet temperature from a steam-to-water heat exchanger,
   iii) the steam-to-water heat exchanger operatively connected in fluid communication with the steam feed conduit and having a steam infeed and a steam outlet downstream of the steam infeed for channelling steam from the steam feed conduit through the steam-to-water heat exchanger, the steam-to-water heat exchanger having a cold water infeed and a hot water outlet downstream of the cold water infeed for channelling water to be heated through the steam-to-water heat exchanger,
   iv) a hot water conduit operatively connected in fluid communication with the hot water outlet,
   v) a temperature sensor cooperating with the hot water conduit for sensing the temperature of hot water leaving the steam-to-water heat exchanger and for sending corresponding temperature information to a means for controlling the steam flow regulator,
   vi) a means for generating the trigger signal when the temperature of the hot water leaving the steam-to-water heat exchanger falls below a threshold temperature, the means for generating the trigger signal cooperating with the means for controlling the steam flow regulator;
b) providing pressurized steam, by a means for providing pressurized steam, to the steam infeed conduit from a steam boiler so as to re-capture waste heat in a steam circuit of the steam boiler wherein the pressurized steam is otherwise not in demand in the steam circuit within a facility containing the steam boiler wherein the steam circuit may not be otherwise using the steam from the steam boiler;
c) causing, by a hot water demand device, hot water to flow to an end use from the hot water outlet upon demand by the hot water demand device from the end use so as to draw water through the steam-to-water heat exchanger from the cold water infeed;
d) causing the steam flow regulator to open the flow of steam upon the trigger signal to allow flow of steam from the boiler through the steam-to-water heat exchanger upon detection by the temperature sensor of a hot water temperature below the threshold temperature;
e) causing the steam flow regulator to close off the flow of steam to the steam-to-water heat exchanger upon detection by the temperature sensor of a hot water temperature at or above the threshold temperature.

A water-to-water pre-heating heat exchanger may be provided wherein a hot water infeed of the pre-heating heat exchanger is in fluid communication with the steam outlet from the steam-to-water heat exchanger, and wherein a cold water outlet of the pre-heating heat exchanger is in fluid communication with the cold water infeed of the steam-to-water heat exchanger so as to pre-heat cold water fed into the steam-to-water heat exchanger.

The pre-heating heat exchanger may advantageously be mounted in fluid communication between the steam outlet and a condensate tank of the steam boiler, wherein steam condensate flows from the steam outlet through the pre-heating heat exchanger and thence into the condensate tank.

DETAILED DESCRIPTION OF EMBODIMENTS OF THE INVENTION

Figure 1:
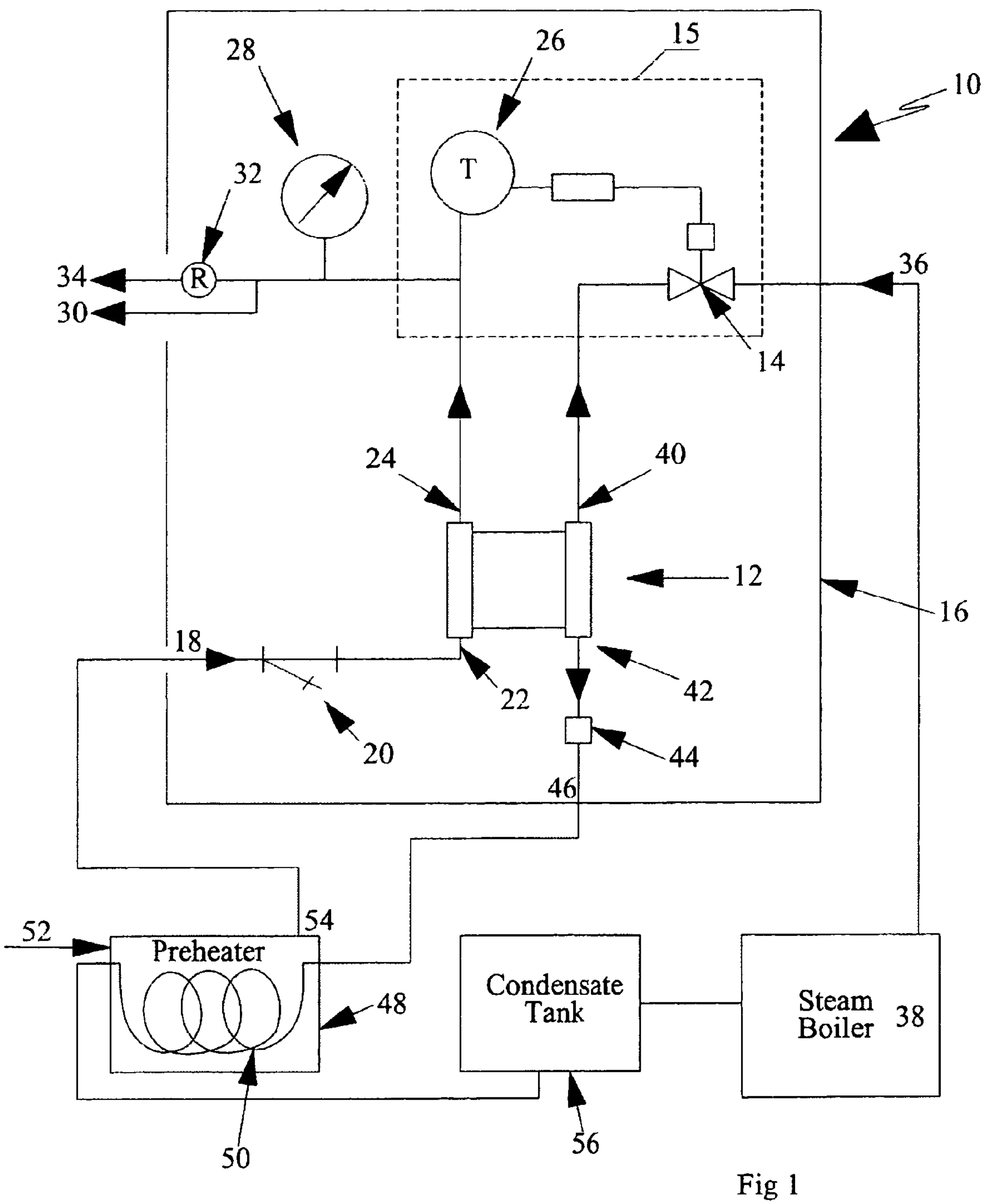
FIG. 1 is, a schematic view of one embodiment of the present invention showing an on-demand steam driven water heater having a steam condensate driven infeed water pre-heater.
Figure 2:
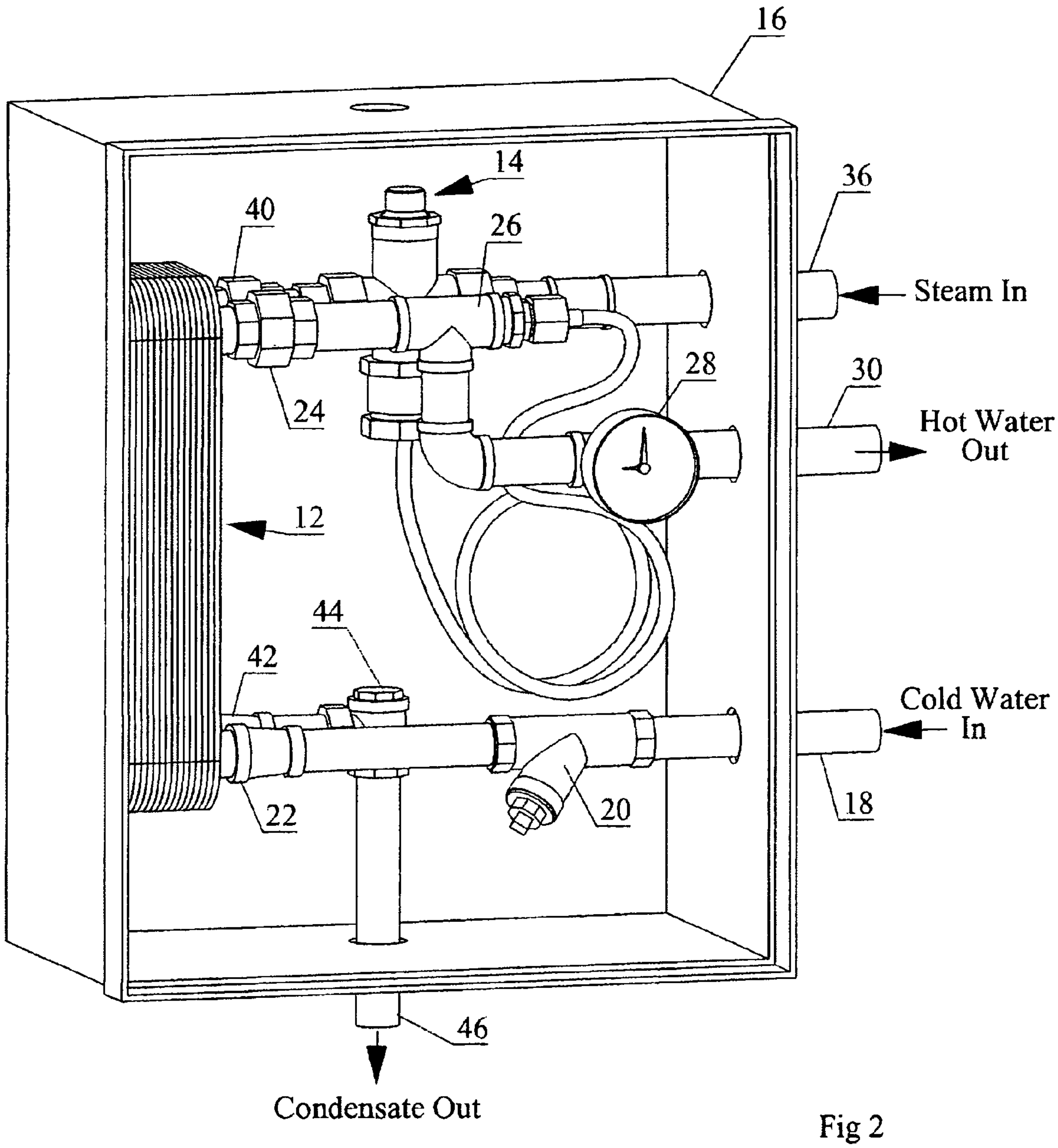
FIG. 2 is, in perspective view, the on-demand water heater according to one aspect of the present invention.
Figure 3:
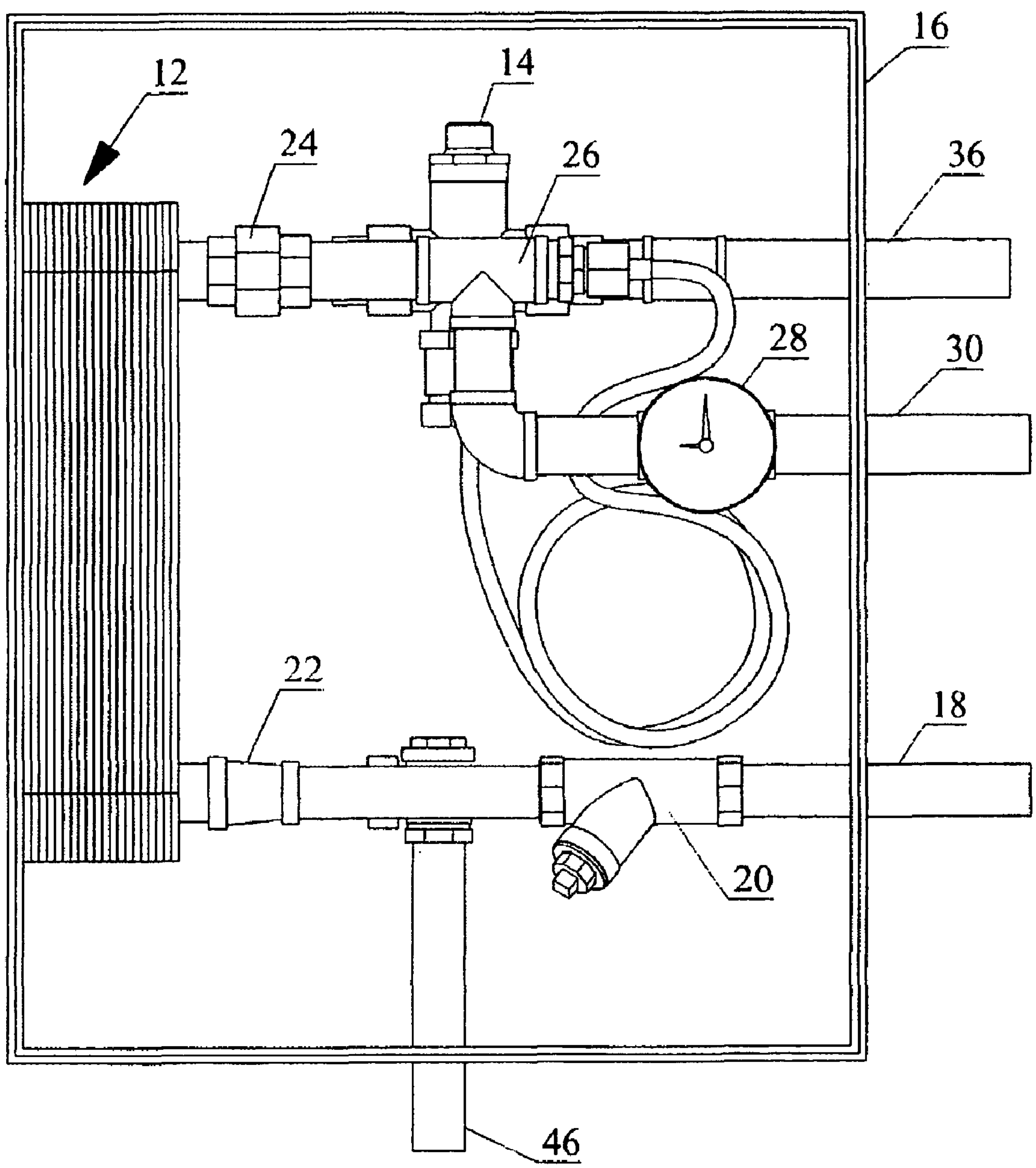
FIG. 3 is in front elevation view, the on-demand water heater of FIG. 2.
Figure 4:
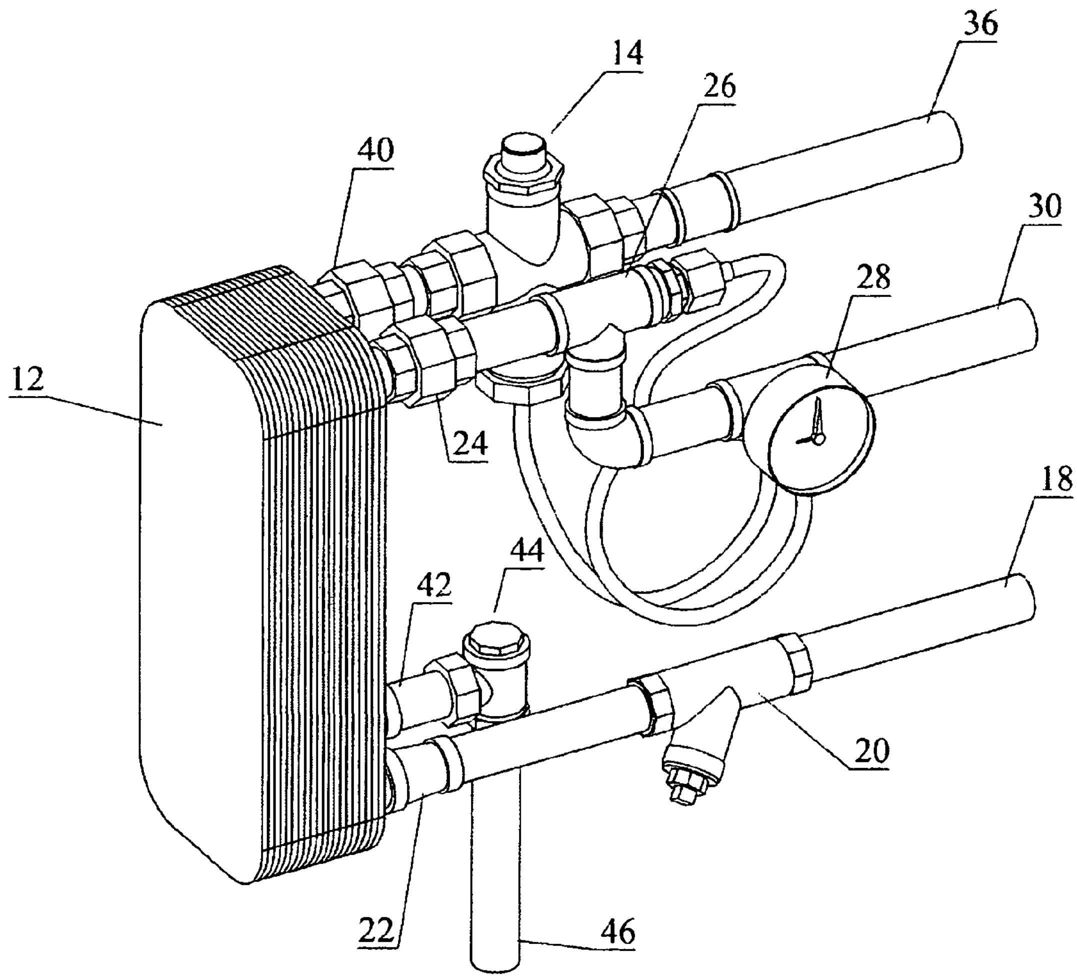
FIG. 4 is, in left side perspective view, the on-demand water heater of FIG. 2 with the cabinet removed.
Figure 5:
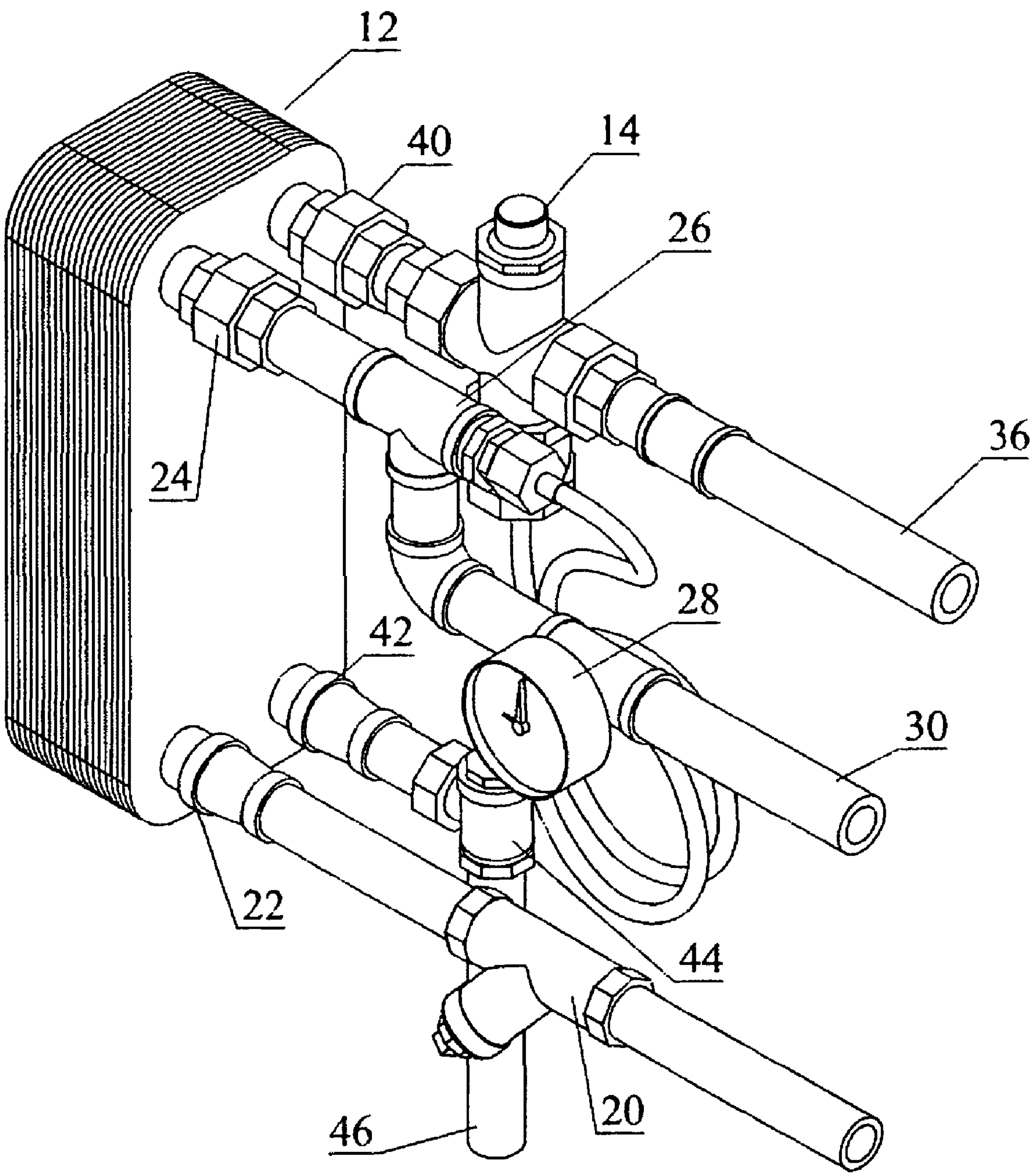
FIG. 5 is, in right side perspective view, the on-demand water heater of FIG. 4.

The present invention includes a small-footprint steam-driven on-demand water heater 10 that uses a steam-to-heat heat exchanger 12 to transfer heat from steam, at for example 15 psi to 300 psi pressure, to water, thereby heating the water. The steam supply is modulated using a self-modulating temperature control valve 14 in order to effect demand based temperature control of the output water temperature.

The water to be heated is supplied to cabinet 16 through water feed pipe 18, which then passes through strainer 20, which removes debris from the water flow. From the strainer the water flows into heat exchanger 12 which may be a vertically oriented brazed plate heat exchanger such as supplied by the SEC company of Belfast, Prince Edward Island, Canada, for example a model M14 20 plate (approximately 12 gallons per minute hot water supply) or 30 plate (approximately 20 gallons per minute hot water supply) brazed plate heat exchanger. Heat exchanger 12 is supplied cold (or pre-heated) water through heat exchanger water inlet port 22, collecting beat from the plates 12*a* in heat exchanger 12 as the water passes through the heat exchanger and eventually exiting from the heat exchanger at hot water outlet 24. The heat exchanger is supported vertically so as to dispose the internal plates 12*a* vertically, The hot water temperature is measured at the hot water outlet 24 of heat exchanger by temperature sensor 26 controlling operation of a steam modulating valve 15 which includes control valve 14. Depending on the temperature set point set on the modulating steam valve, and the measured temperature of the outflow water at outlet 24, the control valve 14 will open if the measured temperature is below the set point (including hysteresis), or close if the measured temperature is at or above the set point. The temperature of the outflow water is also measured and displayed by temperature gauge 28 for a visual indication of the water temperature.

The heated water flows from hot water outlet 24 and out through cabinet hot water outlet 30. The heated water circuit is protected by a hot water temperature and pressure relief valve 32, which opens when the pressure or temperature exceeds the specified values of the valve, resulting in the hot water being vented through hot water over pressure/temperature outlet 34. Heat exchanger 12 is supported in its vertical orientation in cabinet 16.

Steam is supplied to water heater 10 through cabinet steam inlet 36 from boiler 38. The steam flows through modulating steam valve 14 when it is open, and into heat exchanger 12 through the heat exchanger steam inlet port 40. When the steam enters heat exchanger 10 it contacts internal plates 12*a* and transfers heat to the plates. The heat is thermally conducted to the water in the cooler water conduits of the heat exchanger. Eventually enough heat is extracted from the steam so that the steam condenses and flows out of the heat exchanger steam outlet 42 to the steam trap 44, and out of the cabinet steam condensate outlet 46.

In the embodiment of FIG. 1 steam condensate exiting from condensate outlet 46 flows into a pre-heating heat exchanger 48 so as to flow through helical coil conduit 50. Helical coil conduit 50 is immersed in cold water entering heat exchanger 48 through cold water infeed 52. The steam condensate may flow counter-current to the direction of flow of cold water entering heat exchanger 48 through cold water infeed 52 and exiting from heat exchanger 48 through pre-warmed water outlet 54. The pre-warmed water leaving water outlet 54 is fed into water infeed pipe 18 so as to pass through strainer 20 and enter heat exchanger 12 through cold water inlet port 22. Steam condensate leaving helical coil conduit 50 flows into condensate tank 56 for return to steam boiler 38.

When no water is being demanded from the water heater the water temperature at the heat exchanger water outlet 24 will rise in temperature until the set point temperature of the modulating steam valve is met, at which point the control valve 14 will substantially close, effectively shutting off steam to the heat exchanger 12 with the exception that valve 14 is always slightly open, assisting in regulating the water temperature to approximately ±1–2 degrees of 140° F. in the one preferred embodiment. When water is again demanded of the water heater from cabinet hot water outlet 30, the water will begin to flow and cool water will enter heat exchanger 12, and the water temperature at the heat exchanger water outlet 24 will drop until the temperature reaches the set point (plus hysteresis) at which point the control valve 14 will open and allow steam to flow to heat exchanger 12. In this way water may be heated on demand using steam from boiler 38 as a heat source.

Figure 6:
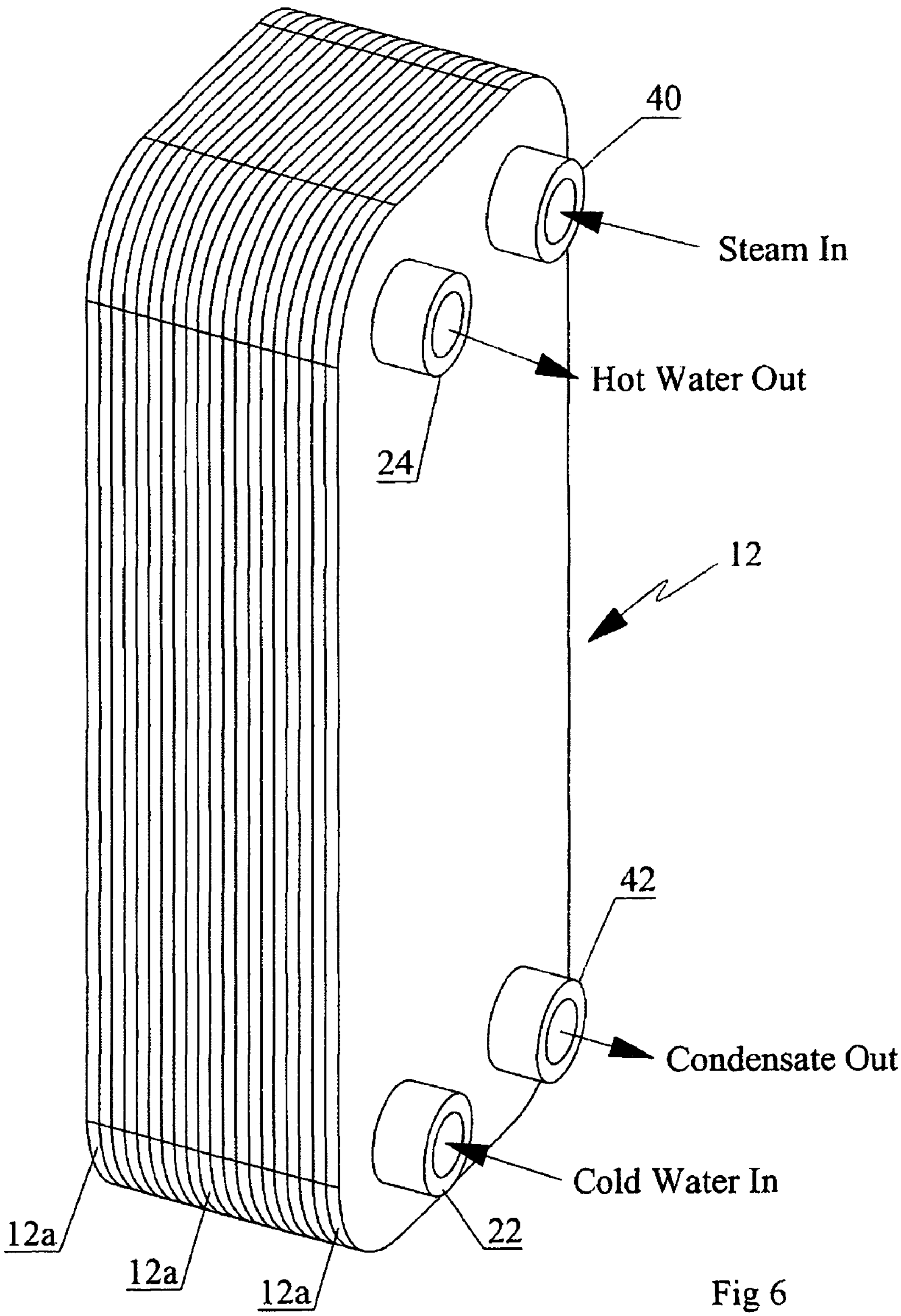
FIG. 6 is, in right side perspective view, the steam-to-water heat exchanger of FIG. 5.
Figure 7:
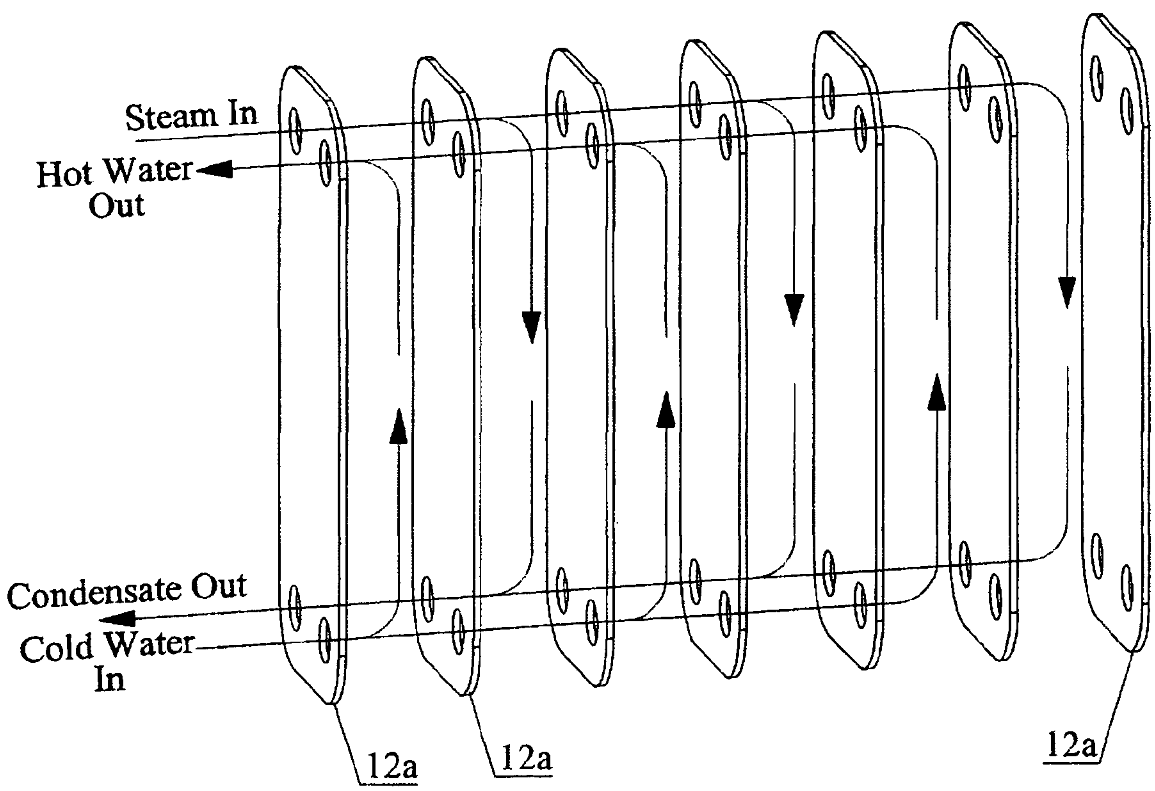
FIG. 7 is, in partially cut away partially exploded view, the steam-to-water heat exchanger of FIG. 6.

As better seen in FIGS. 6 and 7, heat exchanger 12 in one preferred embodiment is a brazed plate heat exchanger, comprised of a sandwich of metal plates 12*a*, for example twenty or thirty plates, so as to interleave layers of water and steam The modulating steam valve in one preferred embodiment may be a Model 150F steam valve supplied by Sterlco of Milwaukee, Wis., USA.

List of items shown in figures

| Item | Description |
|---|---|
| 12 | SEC Brazed Plate Heat Exchanger (M14a (20 or 30 Plate)). |
| 40 | Heat Exchanger Steam Inlet |
| 42 | Heat Exchanger Steam Outlet |
| 22 | Heat Exchanger Water Inlet |
| 24 | Heat Exchanger Water Outlet |
| 15 | Steam Modulating, Water Temperature Driven one inch Valve. (Sterlco Model 150F Modulating Steam Valve, 110F. to 190F. Range) |
| 14 | Valve part of Steam Modulating Valve |
| 26 | Temperature sensor part of Steam Modulating Valve |
| 44 | Steam Trap (Sterlco Self Cleaning one inch Brass Angle Steam Trap.) |
| 32 | Hot Water Pressure Relief Valve (¾ inch Watts #100 XL Temperature Pressure Blow-off Valve.) |
| 20 | Strainer (one inch I.P. Red & White Bronze Y Strainer 380/15) |
| 28 | Temperature Gauge (¼ inch NPT triticator 2½ inch gauge 0 to 75 PSI.) |
| 16 | Cabinet (20 inch by 20 inch by 8 inches deep). |
| 18 | Cabinet Water Inlet |
| 30 | Cabinet Hot Water Outlet |
| 36 | Cabinet Steam Inlet |
| 34 | Hot Water Over Pressure/Temperature Outlet. |
| 46 | Cabinet Steam Condensate Outlet |
| 38 | Steam Boiler |
| 56 | Condensate Tank |
| 48 | Pre-heater |

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for providing on-demand hot water comprising the steps of:

a) providing an on-demand water heater comprising:
  i) a steam infeed conduit,
  ii) a steam flow regulator cooperating with said steam infeed conduit to regulate the flow of steam through said steam infeed conduit according to a trigger signal,
  vii) a steam-to-water heat exchanger operatively connected in fluid communication with said steam feed conduit and having a steam infeed and a steam outlet downstream of said steam infeed for channelling steam from said steam feed conduit through said steam-to-water heat exchanger, said steam-to-water heat exchanger having a cold water infeed and a hot water outlet downstream of said cold water infeed for channelling water to be heated through said steam-to-water heat exchanger,
  viii) a hot water conduit operatively connected in fluid communication with said hot water outlet,
  ix) a temperature sensor cooperating with said hot water conduit for sensing the temperature of hot water leaving said steam-to-water heat exchanger and for sending corresponding temperature information,
  x) a means for generating said trigger signal when the temperature of said hot water leaving said steam-to-water heat exchanger falls below a threshold temperature;

b) providing pressurized steam to said steam infeed conduit from a steam boiler so as to re-capture waste heat in a steam circuit of said steam boiler wherein said pressurized steam is otherwise not in demand in said steam circuit within a facility containing said steam boiler;

c) causing hot water to flow to an end use from said hot water outlet upon demand from the end use so as to draw water through said steam-to-water heat exchanger from said cold water infeed;

d) causing said steam flow regulator to open steam flow upon said trigger signal to allow flow of steam from said boiler through said steam-to-water heat exchanger upon detection by said temperature sensor of a hot water temperature below the threshold temperature;

e) causing said steam flow regulator to close off steam flow to said steam-to-water heat exchanger upon detection by said temperature sensor of a hot water temperature at or above said threshold temperature.

2. The method of claim 1 further comprising the steps of providing a water-to-water pre-heating heat exchanger wherein a hot water infeed of said pre-heating heat exchanger is in fluid communication with said steam outlet from said steam-to-water heat exchanger, and wherein a cold water outlet of said pre-heating heat exchanger is in fluid communication with said cold water infeed of said steam-to-water heat exchanger so as to pre-heat cold water fed into said steam-to-water heat exchanger.

3. The method of claim 2 wherein said steam-to-water heat exchanger is a brazed plate heat exchanger.

4. The method of claim 3 wherein said brazed plate heat exchanger is a 30 plate brazed plate heat exchanger.

5. The method of claim 2 wherein said steam regulator is a steam valve and said temperature sensor is mounted on said hot water outlet.

6. The method of claim 2 further comprising the step of mounting said pre-heating heat exchanger in fluid communication between said steam outlet and a condensate tank of said steam boiler wherein steam condensate flows from said steam outlet through said pre-heating heat exchanger and thence into said condensate tank.

7. The method of claim 2 wherein said pre-heating heat exchanger is a counter-flow heat exchanger.

8. The method of claim 7 wherein the steam condensate from said steam outlet passes through a coil in said pre-heating heat exchanger immersed in cold water flowing between a cold water infeed of said pre-heating heat exchanger and said cold water outlet of said pre-heating heat exchanger.

9. The method of claim 1 wherein said steam-to-water heat exchanger is a brazed plate heat exchanger.

10. The method of claim 9 wherein said brazed plate heat exchanger is a 30 plate brazed plate heat exchanger.

11. The method of claim 1 wherein said steam regulator is a steam valve and said temperature sensor is mounted on said hot water outlet.

12. A device for providing on-demand hot water comprising:

a) an on-demand water heater comprising:

i) a steam infeed conduit, ii) a steam flow regulator cooperating with said steam infeed conduit to regulate the flow of steam through said steam infeed conduit according to a trigger signal, iii) a steam-to-water heat exchanger operatively connected in fluid communication with said steam feed conduit and having a steam infeed and a steam outlet downstream of said steam infeed for channelling steam from said steam feed conduit through said steam-to-water beat exchanger, said steam-to-water heat exchanger having a cold water infeed and a hot water outlet downstream of said cold water infeed for channelling water to be heated through said steam-to-water heat exchanger, iv) a hot water conduit operatively connected in fluid communication with said hot water outlet, v) a temperature sensor cooperating with said hot water conduit for sensing the temperature of hot water leaving said steam-to-water heat exchanger and for sending corresponding temperature information, vi) a means for generating said trigger signal when the temperature of said hot water leaving said steam-to-water heat exchanger falls below a threshold temperature;

b) means for providing pressurized steam to said steam infeed conduit from a steam boiler so as to re-capture waste heat in a steam circuit of said steam boiler wherein said pressurized steam is otherwise not in demand in said steam circuit within a facility containing said steam boiler;

c) means for causing hot water to flow to an end use from said hot water outlet upon demand from the end use so as to draw water through said steam-to-water heat exchanger from said cold water infeed;

d) means for causing said steam flow regulator to open steam flow upon said trigger signal to allow flow of steam from said boiler through said steam-to-water heat exchanger upon detection by said temperature sensor of a hot water temperature below the threshold temperature;

e) means for causing said steam flow regulator to close off steam flow to said steam-to-water heat exchanger upon detection by said temperature sensor of a hot water temperature at or above said threshold temperature.

13. The device of claim 12 further comprising a water-to-water pre-heating heat exchanger wherein a hot water infeed of said pre-heating heat exchanger is in fluid communication with said steam outlet from said steam-to-water heat exchanger, and wherein a cold water outlet of said pre-heating heat exchanger is in fluid communication with said cold water infeed of said steam-to-water heat exchanger so as to pre-heat cold water fed into said steam-to-water heat exchanger.

14. The device of claim 13 wherein said steam-to-water heat exchanger is a brazed plate heat exchanger.

15. The device of claim 14 wherein said brazed plate heat exchanger is a 30 plate brazed plate heat exchanger.

16. The device of claim 13 wherein said steam regulator is a self modulating steam valve and said temperature sensor is mounted on said hot water outlet.

17. The device of claim 13 wherein said pre-heating heat exchanger in fluid communication between said steam outlet and a condensate tank of said steam boiler wherein steam condensate flows from said steam outlet through said pre-heating heat exchanger and thence into said condensate tank.

18. The device of claim 12 wherein said steam-to-water heat exchanger is a brazed plate heat exchanger.

19. The device of claim 18 wherein said brazed plate heat exchanger is a 30 plate brazed plate heat exchanger.

20. The device of claim 12 wherein said steam regulator is a self modulating steam valve and said temperature sensor is mounted on said hot water outlet.

* * * * *